(12) United States Patent
Kompella et al.

(10) Patent No.: US 8,848,514 B2
(45) Date of Patent: Sep. 30, 2014

(54) SYSTEM AND METHOD FOR FAILOVER HANDLING AT GEO-REDUNDANT GATEWAYS

(75) Inventors: Vachaspati P. Kompella, Cupertino, CA (US); Satyam Sinha, Sunnyvale, CA (US); Praveen Vasant Muley, Mountain View, CA (US); Sathyender Nelakonda, Saratoga, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 58 days.

(21) Appl. No.: 13/423,250

(22) Filed: Mar. 18, 2012

(65) Prior Publication Data

US 2012/0236823 A1 Sep. 20, 2012

Related U.S. Application Data

(60) Provisional application No. 61/454,328, filed on Mar. 18, 2011.

(51) Int. Cl.
*G06F 11/00* (2006.01)
*H04W 24/04* (2009.01)
*H04W 88/14* (2009.01)

(52) U.S. Cl.
CPC .............. *H04W 24/04* (2013.01); *H04W 88/14* (2013.01)
USPC .......................................... 370/220; 714/4.11

(58) Field of Classification Search
CPC ......... H04L 41/00; H04L 41/04; H04L 41/06; H04L 41/0654; H04L 69/40; H04W 24/04
USPC .......... 370/216–220, 242, 244, 250; 714/2, 3, 714/4.1, 4.11, 4.2, 4.21
See application file for complete search history.

(56) References Cited

U.S. PATENT DOCUMENTS

| | | | |
|---|---|---|---|
| 6,751,748 | B1 | 6/2004 | Bush |
| 7,296,073 | B1 * | 11/2007 | Rowe ............................ 709/227 |
| 7,376,078 | B1 | 5/2008 | Amiocangioli et al. |
| 8,099,504 | B2 * | 1/2012 | Cherian et al. ................ 709/227 |
| 2004/0122961 | A1 * | 6/2004 | Rouault ........................ 709/229 |
| 2005/0240797 | A1 * | 10/2005 | Orava et al. ....................... 714/4 |
| 2006/0047836 | A1 * | 3/2006 | Rao et al. ...................... 709/229 |
| 2008/0254768 | A1 | 10/2008 | Faccin |
| 2008/0293412 | A1 | 11/2008 | Grahn et al. |

(Continued)

FOREIGN PATENT DOCUMENTS

| | | | | |
|---|---|---|---|---|
| EP | | 576079 A1 * | 12/1993 | ............... H04Q 7/04 |
| WO | WO 01/91370 A2 | | 11/2001 | |

(Continued)

OTHER PUBLICATIONS

The International Search Report And The Written Opinion Of The International Searching Authority, Or The Declaration, mailed Jun. 13, 2012, in PCT/US2012/029580, Alcatel-Lucent USA Inc., Applicant, 12 pages.

(Continued)

*Primary Examiner* — Kerri Rose
(74) *Attorney, Agent, or Firm* — Wall & Tong, LLP

(57) ABSTRACT

A method, system and apparatus for reversion of UE sessions from a backup SGW or protect node to an operationally restored primary SGW or working node.

20 Claims, 7 Drawing Sheets

(56) References Cited

U.S. PATENT DOCUMENTS

| | | | |
|---|---|---|---|
| 2009/0010257 A1* | 1/2009 | Chaudhry et al. | 370/390 |
| 2010/0220656 A1 | 9/2010 | Ramankutty et al. | |
| 2011/0235605 A1 | 9/2011 | Yeoum et al. | |
| 2011/0286465 A1 | 11/2011 | Koodli et al. | |
| 2012/0063300 A1* | 3/2012 | Sahin et al. | 370/225 |
| 2012/0134259 A1 | 5/2012 | Bonnier et al. | |
| 2012/0182862 A1* | 7/2012 | Cirkovic | 370/220 |
| 2012/0195186 A1* | 8/2012 | Singh et al. | 370/217 |

FOREIGN PATENT DOCUMENTS

| | | |
|---|---|---|
| WO | WO 03/061326 A1 | 7/2003 |
| WO | WO 2005/043821 A1 | 5/2005 |
| WO | WO 2006/024307 A1 | 3/2006 |
| WO | WO 2008/042869 A2 | 4/2008 |
| WO | WO 2008/081007 A1 | 7/2008 |
| WO | WO 2011/026663 | 3/2011 |

OTHER PUBLICATIONS

The International Search Report And The Written Opinion Of The International Searching Authority, Or The Declaration, mailed Jul. 4, 2012, in PCT/US2012/029579, Alcatel-Lucent USA Inc., Applicant, 10 pages.

The International Search Report And The Written Opinion Of The International Searching Authority, Or The Declaration, mailed Jun. 13, 2012, in PCT/US2012/029583, Alcatel-Lucent USA Inc., Applicant, 11 pages.

* cited by examiner

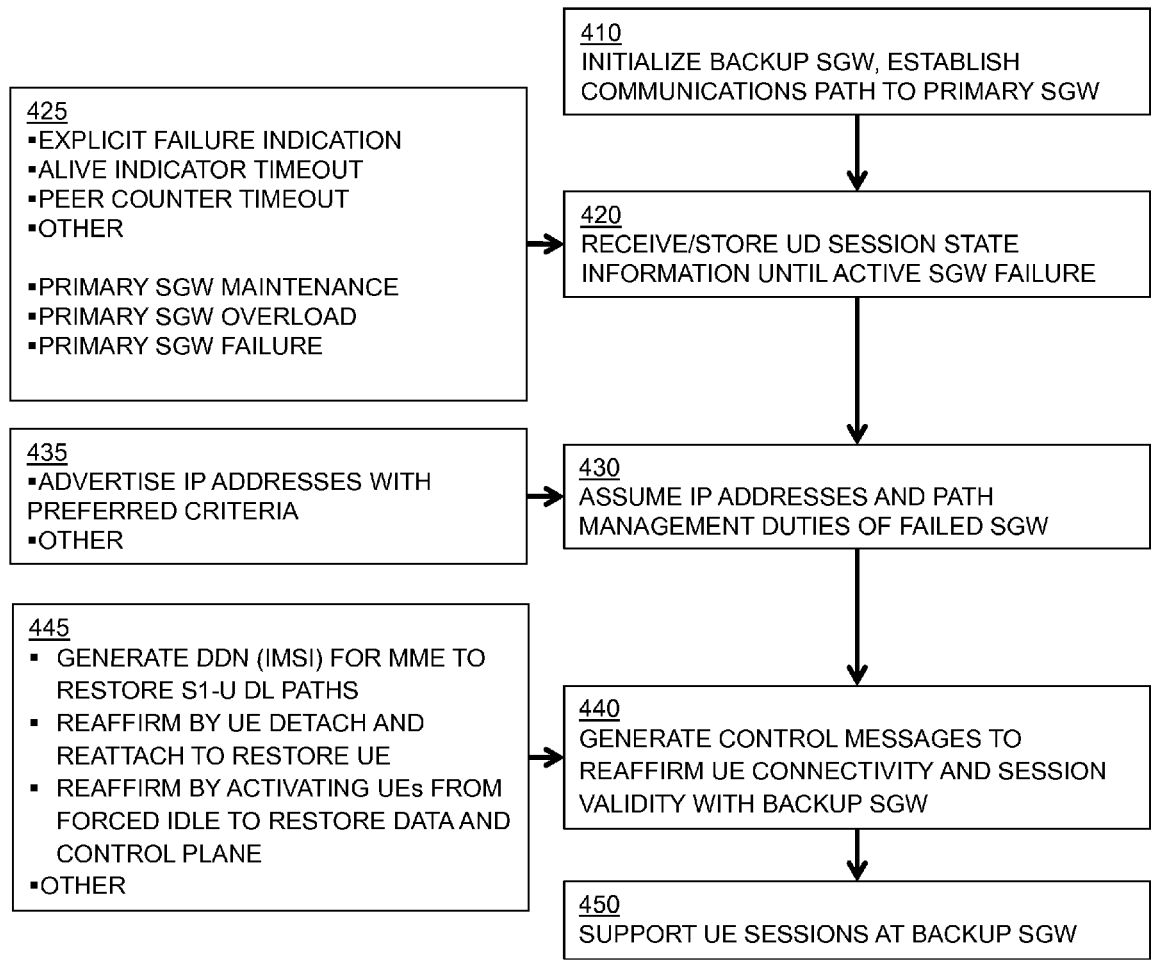
400    FIG. 4

SYSTEM AND METHOD FOR FAILOVER HANDLING AT GEO-REDUNDANT GATEWAYS

CROSS REFERENCE TO RELATED APPLICATIONS

This patent application claims priority to U.S. Provisional Patent Application Ser. No. 61/454,328, entitled GEO-REDUNDANCE IN A SERVING GATEWAY, filed Mar. 18, 2011, which is herein incorporated by reference in its entirety.

This patent application is related to simultaneously filed U.S. patent application Ser. No. 13/423,247, filed on Mar. 18, 2012, entitled SYSTEM AND METHOD FOR SESSION RESILIANCY AT GEO-REDUNDANT GATEWAYS, and Ser. No. 13/423,249, filed on Mar. 18, 2012, entitled SYSTEM AND METHOD FOR SESSION RESTORATION AT GEO-REDUNDANT GATEWAYS, both of which are herein incorporated by reference in their entireties.

FIELD OF THE INVENTION

The invention relates generally to managing network resources and, more specifically but not exclusively, adapting operations associated with a system router such as a Serving Gateway (SGW).

BACKGROUND

A wireless network, illustratively a Long Term Evolution (LTE) network, may comprise groups of mobile telephones or other user equipment (UE) communicating with one or more eNodeBs, which communicate with one or more Serving Gateways (SGWs), which communicate with a Packet Data Network (PDN) Gateway (PGW), which communicates with fixed networks such as IP Multimedia Subsystem (IMS) access networks or core networks. Additionally, the LTE network includes various network elements such as Mobility Management Entities (MMEs), a Policy and Charging Rules Function (PCRF), a network management system (NMS) and so on.

In a failure scenario where a Serving Gateway (SGW) loses connectivity with other nodes in the network (e.g., due to network disconnection, power failure, or even a triggered behavior based on partial failures), a backup SGW must take over operations. This should be accomplished in an intelligent manner to avoid unreasonable spiking in resource utilization while continuing to meet reasonable user/subscriber expectations.

When the primary SGW fails, all of the packets destined for the failed SGW are dropped. In addition, the MME will lose path management states associated with the failed SGW and will need clean up all its active sessions. This will cause the active UEs to re-connect to the network through the backup SGW or an alternate SGW. Similarly, the PGW will lose its path management state to the SGW, and will clean up session state towards the IMS subsystem (all UEs are active on the PGW and into the network). With the active UEs re-attaching, their state will be restored to the PGW and the IMS subsystem.

However, since the majority of UEs are idle at any given moment, at the time of the primary SGW failure the MME will not reach out to the idle UEs to clean up their sessions. This is because the first step to cleaning up the idle UE sessions is to page each of the idle UEs, which is prohibitively expensive. If an idle UE is not cleaned up, there is no way for a network-initiated call to reach it because no network entity knows where in the network it is currently located. Moreover, the IMS sub-system cannot find the UE and no entity is actively encouraging the UE to re-identify itself. The consequence is significant as the UE will not be reachable for up to an hour or two, depending on various timers. This is unacceptable for users.

BRIEF SUMMARY

Various deficiencies of the prior art are addressed by the present invention of a method, system and apparatus for reversion of UE sessions from a backup SGW or protect node to an operationally restored primary SGW or working node.

In one embodiment, a method, system and apparatus contemplates, in response to a determination that a primary SGW has returned to operation, synchronizing user equipment (UE) session state information between backup and primary SGWs for at least those UEs previously supported by the primary SGW; and in response to a revertive action trigger, creating a handover channel between the backup and primary SGWs to enable a transition of UE support from the backup SGW to the primary SGW.

BRIEF DESCRIPTION OF THE DRAWINGS

The teachings of the present invention can be readily understood by considering the following detailed description in conjunction with the accompanying drawings, in which:

FIG. 4 depicts a flow diagram of a session state restoration method according to an embodiment;

To facilitate understanding, identical reference numerals have been used, where possible, to designate identical elements that are common to the figures.

DETAILED DESCRIPTION OF THE INVENTION

The invention will be primarily described within the context of a Long Term Evolution (LTE) network in which Service Gateway (SGW) redundancy such that both active and idle subscribers are transitioned from a failed SGW to a backup SGW.

Although primarily depicted and described herein within the context of providing management and backup functions within a 4G LTE wireless network, it will be appreciated that the management and backup functions depicted and described herein may be utilized within other types of wireless networks (e.g., 2G networks, 3G networks, WiMAX, etc.), wireline networks or combinations of wireless and wireline networks. Thus, the various network elements, links and other functional entities described herein with respect to an LTE network may be broadly construed to identify corresponding network elements, links and other functional entities associated with various other types of wireless and wireline networks.

Part of the invention rests in the recognition of the inventors that the dramatically increasing size of wireless networks in particular leads to specific network management problems that are not properly addressed by existing solutions. In particular, it was recognized by the inventors existing solutions scaled poorly and failed to address the reality that subscriber equipment may be in various steady states (such as Idle or Active states), or in various transitional states (such as progressing between call flows, moving between an Idle state and an Active state, engaged in a handover from one eNodeB to another, creating a dedicated bearer, destroying a PDN session and so on). Furthermore, subscriber traffic may be flowing to or from the subscriber in any one of the study or transitional states.

Figure 1:
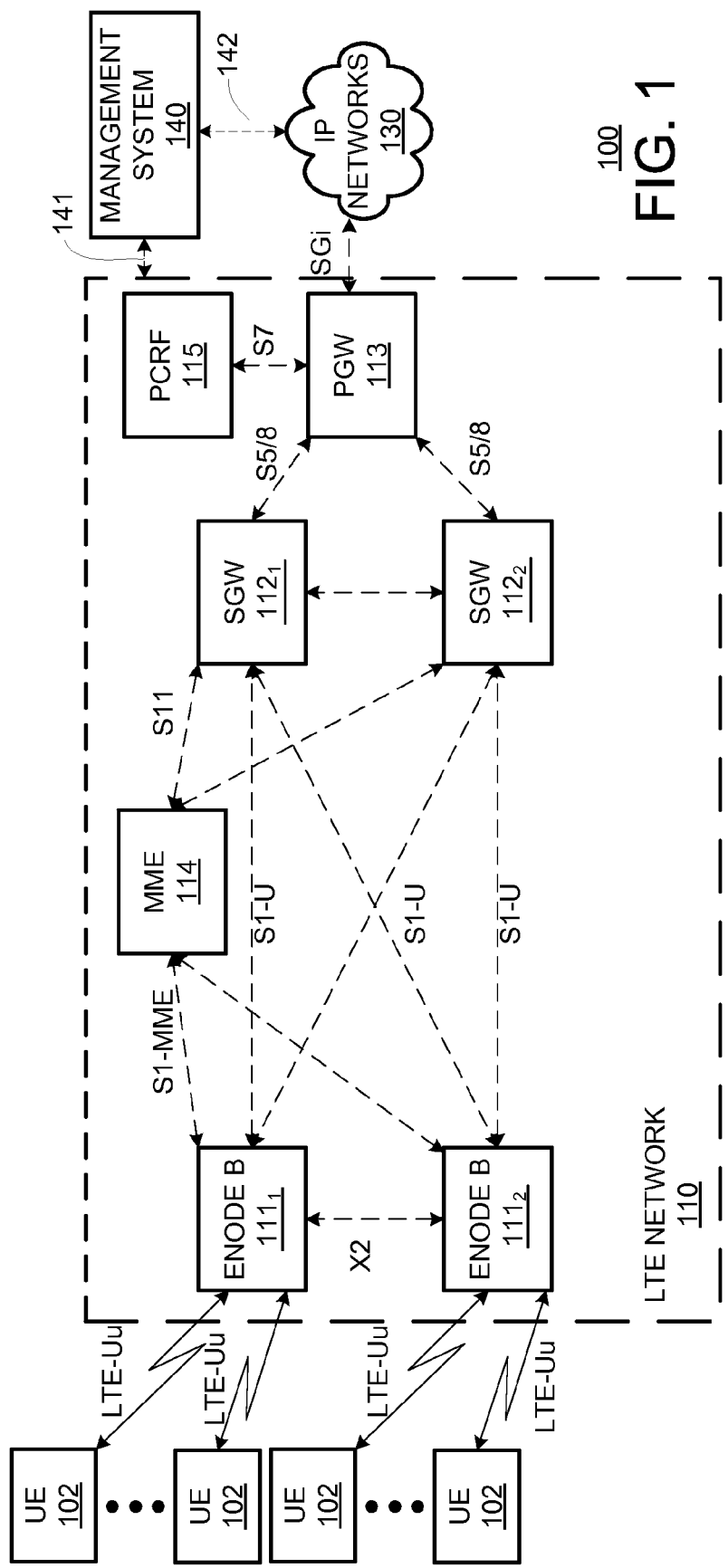
FIG. 1 depicts an exemplary communication system benefiting from an embodiment.

FIG. 1 depicts an exemplary wireless communication system including management and backup/protection functions according to an embodiment. Specifically, FIG. 1 depicts an exemplary wireless communication system 100 that includes a plurality of User Equipment (UEs) 102, a Long Term Evolution (LTE) network 110, IP networks 130, and a network management system (NMS) 140. The LTE network 110 supports communications between the UEs 102 and IP networks 130. The MS 140 is configured for supporting various management functions for LTE network 110. The configuration and operation of LTE networks will be understood by one skilled in the art.

The exemplary UEs 102 are wireless user devices capable of accessing a wireless network, such as LTE network 110. The UEs 102 are capable of supporting control signaling in support of the bearer session(s). The UEs 102 may be mobile phones, personal digital assistants (PDAs), computers, tablets devices or any other wireless user device.

The exemplary LTE network 110 includes, illustratively, two eNodeBs $111_1$ and $111_2$ (collectively, eNodeBs 111), two Serving Gateways (SGWs) $112_1$ and $112_2$ (collectively, SGWs 112), a Packet Data Network (PDN) Gateway (PGW) 113, a Mobility Management Entity (MME) 114, and a Policy and Charging Rules Function (PCRF) 115. The eNodeBs 111 provide a radio access interface for UEs 102. The SGWs 112, PGW 113, MME 114, and PCRF 115, as well as other components which have been omitted for purposes of clarity, cooperate to provide an Evolved Packet Core (EPC) network supporting end-to-end service delivery using IP.

The eNodeBs 111 support communications for UEs 102. As depicted in FIG. 1, each eNodeB 111 supports a respective plurality of UEs 102. The communication between the eNodeBs 111 and the UEs 102 is supported using LTE-Uu interfaces associated with each of the UEs 102.

The SGWs 112 support communications for eNodeBs 111 using, illustratively, respective S1-u interfaces between the SGWs 112 and the eNodeBs 111. The S1-u interfaces support per-bearer user plane tunneling and inter-eNodeB path switching during handover.

As depicted in FIG. 1, SGW $112_1$ supports communications for eNodeB $111_1$ and SGW $112_2$ supports communications for eNodeB $111_2$. In various protection/backup embodiments, SGW $112_1$ is also capable of supporting communications for eNodeB $111_2$ and SGW $112_2$ is also capable of supporting communications for eNodeB $111_1$.

The PGW 113 supports communications for the SGWs 112 using, illustratively, respective S5/S8 interfaces between PGW 113 and SGWs 112. The S5 interfaces provide functions such as user plane tunneling and tunnel management for communications between PGW 113 and SGWs 112, SGW relocation due to UE mobility, and the like. The S8 interfaces, which may be Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The PGW 113 facilitates communications between LTE network 110 and IP networks 130 via an SGi interface.

The MME 114 provide mobility management functions in support of mobility of UEs 102. The MME 114 supports the eNodeBs 111 using, illustratively, respective S1-MME interfaces which provide control plane protocols for communication between the MME 114 and the eNodeBs 111.

The PCRF 115 provides dynamic management capabilities by which the service provider may manage rules related to services provided via LTE network 110 and rules related to charging for services provided via LTE network 110.

As depicted and described herein with respect to FIG. 1, elements of LTE network 110 communicate via interfaces between the elements. The interfaces described with respect to LTE network 110 also may be referred to as sessions. The LTE network 110 includes an Evolved Packet System/Solution (EPS). In one embodiment, the EPS includes EPS nodes (e.g., eNodeBs 111, SGWs 112, PGW 113, MME 114, and PCRF 115) and EPS-related interconnectivity (e.g., the S* interfaces, the G* interfaces, and the like). The EPS-related interfaces may be referred to herein as EPS-related paths.

The IP networks 130 include one or more packet data networks via which UEs 102 may access content, services, and the like.

The MS 140 provides management functions for managing the LTE network 110. The MS 140 may communicate with LTE network 110 in any suitable manner. In one embodiment, for example, MS 140 may communicate with LTE network 110 via a communication path 141 which does not traverse IP networks 130. In one embodiment, for example, MS 140 may communicate with LTE network 110 via a communication path 142 which is supported by IP networks 130. The communication paths 141 and 142 may be implemented using any suitable communications capabilities. The MS 140 may be implemented as a general purpose computing device or specific purpose computing device, such as described below with respect to FIG. 10.

Figure 2:
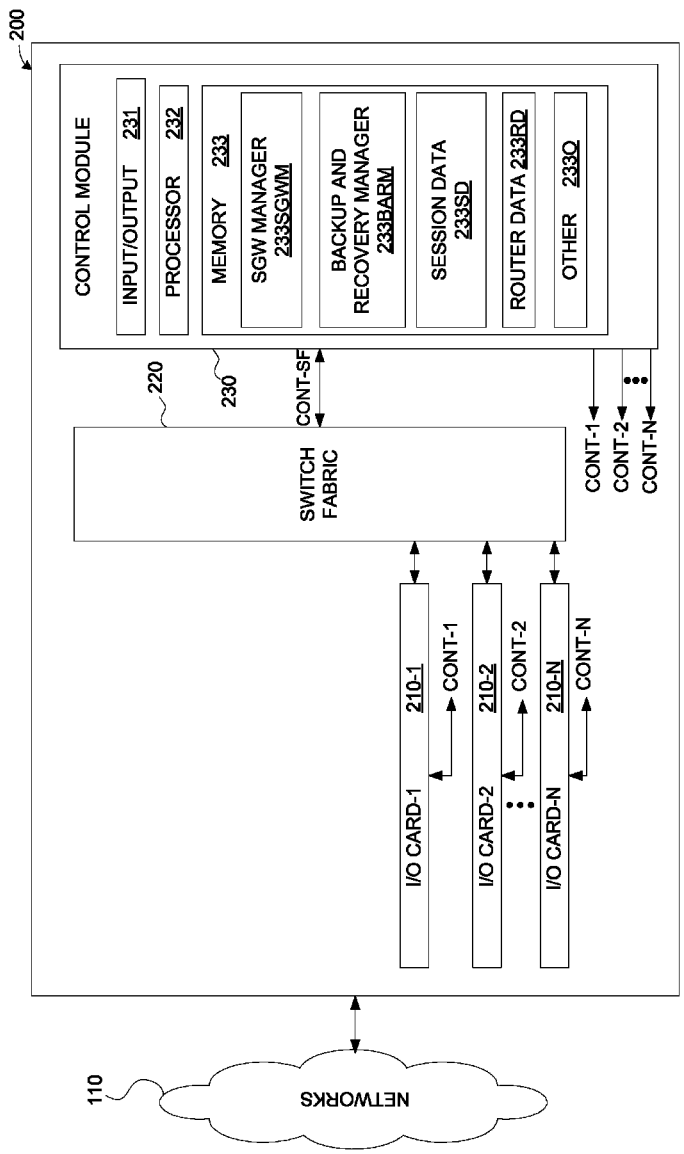
FIG. 2 depicts an exemplary Serving Gateway (SGW) router architecture suitable for use in communication system of FIG. 1.

FIG. 2 depicts an exemplary Serving Gateway (SGW) router architecture suitable for use in communication system of FIG. 1. Specifically, FIG. 1 depicts a router 200 operating as a SGW such as SGW 112 depicted above with respect to FIG. 1. The router 200 communicates with various network elements (not shown) via a network 110, such as the network 110 depicted above with respect to FIG. 1. It will be appreciated by those skilled in the art that the specific topology depicted herein with respect to the SGW 200 may be modified while maintaining the basic SGW functionality.

The SGW 200 is depicted as including a plurality of input output (I/O) cards 210-1, 210-2 and so on up to 210-N (collectively I/O cards 210), a switch fabric 220 and a control module 230. The control module 230 controls the operation of the I/O cards 210 and switch fabric 220 by respective control signals CONT. The control module 230 also performs various SGW functions as described herein.

Each of the I/O cards 210 includes a plurality of ingress ports, egress ports, controllers and so on (not shown) which operate to convey packets between the network 110 and the switch fabric 220. Packets received at a particular ingress port of an I/O card 210 may be conveyed to the switch fabric 220 or back to the network 110 via an egress port of the same I/O card 210 or a different I/O card 210. Routing of packets via the I/O cards 210 is accomplished in a standard manner according to routing data provided by the control module 230

The switch fabric 220 may comprise any standard switch fabric such as electrical, optical, electro-optical, MEMS and the like.

The control module 230 receives configuration data, routing data, policy information and other information pertaining to various SGW operational and management functions from a network manager (not shown), such as the network management system (NMS) 140 discussed above with respect to FIG. 1. The control module 230 also provides configuration data, status data, alarm data, performance data and other information pertaining to operational and management functions to the network manager.

The control module 230 comprises an I/O module 231, a processor 232 and memory 233. The memory 233 is depicted as including software modules, instantiated objects and the like to provide a SGW manager 233SGWM, a backup and recovery manager 23BARM, session data 233SD, router data 233RD and other functions/data 2330. The control module 230 may be implemented as a general purpose computing device or specific purpose computing device, such as described below with respect to FIG. 6.

The SGW manager 233SGWM operates to manage the various Serving Gateway (SGW) functions as known to those skilled in the art and further described herein.

The backup and recovery manager 23BARM operates to manage the backup and recovery functions described herein with respect to the various embodiments. For example, such backup and recovery functions may be different depending upon whether the SGW is operating as a primary or active SGW, a secondary or backup SGW, or both. Generally speaking, the various embodiments contemplate the transport and storage at a backup SGW of some or all of the session related data associated with user equipment or mobile devices for subscribers supported by the active SGW, such that rapid recovery of both active and idle sessions may be provided to such subscribers.

The session data 233SD comprises session data associated with user equipment or mobile devices for subscribers. If the SGW is operating as a primary or active SGW, then the session data 233SD may comprise information supporting the user equipment or mobile devices for subscribers forth by the primary or active SGW. If the SGW is operating as a secondary or backup SGW, then the session data 233SD may comprise a portion of the session data associated with one or more primary or active SGWs supported by the backup SGW.

The routing data 233RD comprises routing information associated with the packet or traffic flows to be processed by the SGW, such as for processing packet or traffic flows received at ingress ports that are to be routed toward appropriate egress ports within the context of basic routing functions of the SGW. The routing data 233RD may include routing tables, protection or fault recovery information and so on.

The other functions/data 2330 comprises programs, functions, data structures and the like operative to perform the various functions described herein with respect to standard SGW operations as well as SGW operations according to various embodiments which are not explicitly attributed to other management or data entities.

Backup SGW Selection and Geo-Redundant Pairing

The MME may be alerted to the failure of an SGW by nodes or network elements adjacent to the failed SGW. These adjacent nodes or network elements may independently take corrective action to re-establish connectivity through a previously assigned backup SGW, through a backup SGW identified by the MME, or through some other routing means.

In various embodiments, a specific backup SGW is assigned to one or more primary or active SGWs within the network by, illustratively, the network management system (NMS). A selected backup SGW may be the SGW most geographically proximate to a primary or active SGW. Moreover, some primary or active SGWs may operate as backup SGWs to other primary or active SGWs.

In various embodiments, a specific backup SGW is selected after a failure of a primary or active SGW. In these embodiments the backup SGW may be selected based on various criteria, including some or all of geographic proximity to the failed SGW, DNS response criteria, path management verification criteria, session loading, and various other criteria. In various embodiments, the selection of a backup SGW is made by the MME from, for example, a pool of SGWs available to the particular MME which is drawn upon to provide a backup SGW in the event of one of the pooled SGWs fails.

In one embodiment, SGWs 112 are geographically proximate each other such that may be used to form a geo-redundant pair of SGWs. Generally speaking, traffic and data flows from UEs 102 of a particular eNodeB 111 are primarily routed to the PGW 113 via a particular SGW, the particular SGW functioning as a primary or working SGW with respect to the voice and data traffic from the eNodeB. That is, one of the SGWs is configured as a working or primary node while the other is configured as a protection or backup node. In a normal state of operations (i.e., no failure), the working node operates to process calls flows and data flows from, illustratively, a plurality of eNodeBs while the protection node operates to back up the working node in case of a failure of the working node.

In one embodiment, first SGW $112_1$ operates as a primary or working SGW with respect to voice and data traffic from the first eNodeB $111_1$, while the second SGW $112_2$ operates as a secondary or backup SGW with respect to voice and data traffic from the first eNodeB $111_1$.

In one embodiment, second SGW $112_2$ operates as a primary or working SGW with respect to voice and data traffic from the second eNodeB $111_2$, while the first SGW $112_1$ operates as a secondary or backup SGW with respect to voice and data traffic from the second eNodeB $111_2$.

In one embodiment, the first and second SGWs 112 operate as primary or working SGWs with respect to voice and data traffic from their own one (or more) respective eNodeBs, and secondary or backup SGWs with respect to voice and data traffic from the one (or more) eNodeBs associated with the other SGW.

Various embodiments discussed herein are directed toward rapidly restoring sessions, voice and data traffic, and various other management information or contexts associated with such UEs 102 in response to a failure of the primary working SGW. In particular, to provide rapid and efficient protection/backup functions between the SGWs, various embodiments contemplate several levels of redundant storage of session state information associated with user equipment to enable rapid transition to the backup SGW without significant impact to subscriber experience. In particular, session state information redundancy enables both the MME 114 and PGW 113 to maintain state information for idle subscriber UE such that active sessions may be rapidly reestablished and the subscriber experience and enhanced.

Failover Handling

Within the context of "transferring" support for UEs 102 and/or eNodeBs 111 from a failed or failing SGW 112 to a backup SGW 112 (and then migrated in whole or in part back to the primary SGW when it becomes operational again), full survivability of user sessions may not always be achievable. However, the various embodiments discussed herein are adapted to promote fast restoration of services utilizing on-demand restoration of services while maintaining a low synchronization overhead between active and backup SGWs.

On-demand restoration of services is where a backup SGW only processes sessions that are requesting activity. On an SGW in active use, there may be a large number of idle sessions that do not require immediate restoration. Over a period of time, these sessions become active, and at that time, it becomes necessary to reconnect those sessions. With this just-in-time restoration approach, the network is not overburdened with signaling overheads for sessions that are not active.

Low synchronization overhead is where data synchronization operations, session state updates and the like between a primary SGW and its backup SGW are kept to a minimum. Typically, there is significant traffic between an active SGW and a MME directed toward various functions such as keeping track of sessions that are becoming active, going idle, or handing over from one eNodeB to another. These activities happen so frequently that it is a significant burden to communicate all these changes between the active and backup SGWs. Generally speaking, the various embodiments utilize only the knowledge of which sessions existed on the active SGW at the time of the failure.

The various methodologies and techniques described herein provide a mechanism by which both control and data planes of user sessions on a primary SGW may be restored via a backup SGW (and then migrated in whole or in part back to the primary SGW when it becomes operational again) in response to a failure of the primary SGW. Various embodiments of the session restoration mechanism described herein address three components; namely, (1) IP address survivability, (2) path management continuity, and (3) session restoration.

IP address survivability is the process of ensuring that network elements connected to the backup SGW continue to be able to access the IP address(es) of the failed SGW throughout the transfer process to the backup SGW.

In some embodiments, IP address survivability is implemented using a virtual IP address, such as through the use of VRRP (layer 2 approach) or anycast IP address (layer 3 approach).

In some embodiments, IP address survivability is implemented by having the active and backup SGW advertise the same IP address, wherein the active SGW advertising the IP address with a highly preferred metric while the backup SGW advertises the IP address with a non-preferred or "poisoned" metric. In these embodiments, any network elements choosing between the advertise IP addresses will always choose that of the active SGW since this address is highly preferred. When the active SGW fails and the only valid IP address is that advertised by the backup SGW, then network elements will choose the backup SGW all data plane and control plane traffic.

Path management continuity is the process of ensuring that network elements with path management to the failed SGW maintain continuity through the transfer process to the backup SGW. In some embodiments, the active SGW engages in a periodic path management relationship with various other network elements (e.g., MME, eNodeB, PGW). Each path management instance is identified by a Restart Counter that is sent in an Echo Request. If this number changes, it signifies that the network element has been restarted (because of a reboot or an administrative action that brought the network element down and back up).

When the backup SGW takes over, it receives path management Echo Requests and responsively transmits Echo Replies. In addition, the backup SGW sends Echo Requests and field Echo Replies. For every peer, the backup SGW will know the received Restart Counter at the active SGW. In this manner, if a Restart Counter from a peer changes then the backup SGW may responsively clean up sessions associated with that peer. In various embodiments, when the backup SGW sends Echo Requests it will also send the Restart Counter that the active SGW used to send. In this manner, peers of the active SGW will do not clean up sessions.

Resilient session restoration is the process of identifying a session that is down or inactive, and restoring the identified session as soon as possible through the backup SGW. In resilient session restoration, the active SGW conveys enough information about each UE so that the backup SGW can restore both control and data planes associated with the UE session. This means that the backup SGW is not only aware of the active SGW's UEs, but processes control messages for those UEs as well as forwarding data plane traffic for those UEs.

Resilient session restoration within the context of, illustratively, an LTE network may provide active processing times of UE within 10 ms while minimizing the impact of network elements of a loss of a primary SGW. Very techniques also provide low synchronization overhead between primary and backup SGWs, no change to idle UE processing, maintaining UE IP address for active and idle UEs and maintaining the charging session.

A session resilience phase executes whenever there is activity on a session. The goal is to recover information to establish a downlink path to the UE. This implies that the network elements involved in the signaling and maintenance of the session continue to hold on to the sessions so they can communicate with their peers. It is noted that a UE's session state, apart from its downlink TEID, generally stays constant. In effect, the Idle UE session state is a relatively invariant portion of the session state of a UE. Thus, by keeping the UE in Idle Mode the main restoration effort is directed toward the downlink TEID.

After an active SGW failure scenario, all traffic, whether data plane or control plane, will be routed to the backup SGW. When data traffic arrives on the S5-u interface of the backup SGW, it will arrive on a tunnel having a tunnel endpoint identifier (TEID) that has been programmed in the data plane of the backup SGW. Since the UE state is maintained as Idle Mode, the normal behavior of the SGW is to transmit a Downlink Data Notification message to inform the MME to page the UE, and to return the downlink TEID (DL TEID) and eNodeB for the UE. If the UE is actually in Idle Mode, then the MME will page the UE and re-establish the downlink path. If the UE is active, then the MME does not have to page the UE, but will instead provide to the SGW the existing downlink TEID for the eNodeB that the UE is attached to. For data arriving on the S1-u interface of the backup SGW, the uplink data path has already been programmed and the data forwarding can be completed. It is noted that this operation is available to both and active UE and an idle UE. Downlink return traffic will trigger the Downlink Data Notification as discussed above.

If a control message arrives on the S5-c interface, then the backup SGW will forward the message. If the MME does not send Modify Bearer Requests, then the SGW is aware that the UE was in active state and sends a Downlink Data Notification to the MME in order to trigger the MME to send a Modify Bearer Request with the downlink TEIDs. If the UE was idle, then the MME will automatically send the Modify Bearer Requests. If a control message arrives from the MME, then it is either bringing the UE out of idle (the SGW doesn't have to do anything), sending an idle mode TAU (the SGW doesn't have to do anything), or it is a call flow that requires the UE not to be in idle state (the SGW throws the message away and sends a Downlink Data Notification, eliciting the Modify Bearer Request from the MME).

In various embodiments, the TEID spaces used by the active and backup SGWs are disjoint to ensure that no collisions occur between what has already been programmed on the backup SGW and the UEs that it is backing up.

Generally speaking, the restoration procedure uses information communicated between active and backup SGWs, such as (1) path management Restart Counters and IP addresses of each peer known to the active SGW; and (2) all UE session state information known to the active SGW, except for the downlink TEIDs to the various eNodeBs.

Figure 3:
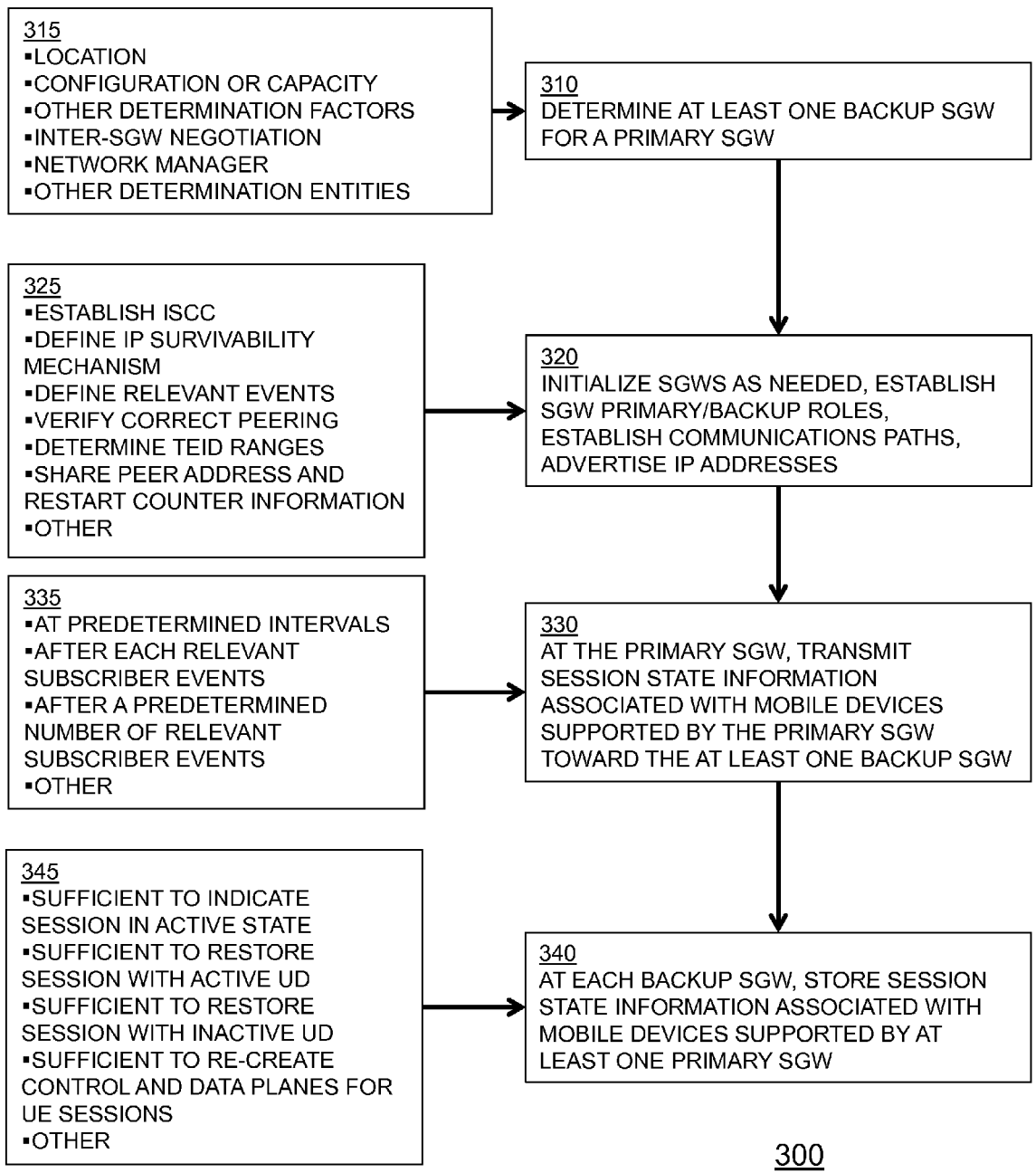
FIG. 3 depicts a flow diagram of a session state backup method according to an embodiment.

FIG. 3 depicts a flow diagram of a session state backup method according to one embodiment. The method includes portions adapted for use in a primary SGW and portions adapted for use in a backup SGW, such as the SGWs 112 described above with respect to FIGS. 1-2.

Generally speaking, the method 300 of FIG. 3 is adapted to store at a backup SGW enough information about each UE 102 supported by an active SGW to enable the backup SGW to take at least limited actions, such as identifying sessions that are down or inactive, and restoring the identified sessions as soon as possible through the backup SGW. The active SGW conveys enough information about each UE to enable the backup SGW to restore both the control and data planes associated with the UE sessions. In this manner, the various network elements involved in the signaling and maintenance of the UE session will continue to view the session as alive and communicate with their peers accordingly.

At step 310, at least one alternative or backup SGW is determined for a primary SGW. That is, for one or more of the SGW's within a network operating as a primary or active SGW, at least one backup SGW is determined. Referring to box 315, the backup SGW may be determined with respect to location, configuration, capacity or other factors associated with the primary and/or backup SGW. The determination may be made by inter-SGW negotiation, such as within the context of a discovery, configuration or optimization process among neighboring SGWs. The determination may also be made by a network manager, such as the network manager 140 described above with respect to FIG. 1. Other entities and/or determination methodologies may be used.

In various embodiments, determination of an alternate or backup SGW for a primary SGW is performed automatically based on one or more of the following selection criteria: DNS response times, path management verification times, session loading and the like. In various embodiments the criteria is also used by the MME to select a new primary SGW for new call setups.

At step 320, the active and backup SGWs are initialized as needed, the primary and backup roles are allocated among the SGWs, communications between the primary and backup SGWs are established, and at least the primary SGW begins to advertise its IP address.

Referring to box 325, the processes at step 320 includes some or all of establishing an inter-SGW communication channel (ISCC) with an inter-SGW communication protocol (ISCP) for conveying the events needs to be established between the active and backup SGWs, defining one or more IP survivability mechanisms to be used, defining the relevant events that will be conveyed from the primary SGW to the backup SGW, determining the range of Tunnel Endpoint Identifiers (TEIDs) that the active SGW will use, sharing peer address and restart counter information and the like.

In various embodiments, during initialization the active SGW identifies itself and requests identification of the backup SGW. After verifying that the peering is between properly configured SGWs, the active SGW declares that it is going to take the active role. When peering is agreed upon, the active SGW begins to advertise its IP addresses for the S1-u, S11, S5-c and S5-u interfaces. In normal operation, the active SGW "owns" the IP address on the S11, S5-c, S5-u and S1-u interfaces. The active SGW also shares a TEID range that it will use, so that the backup SGW can refrain from using that range.

In various embodiments, the active SGW shares with the backup SGW a local Restart Counter for the SGW, where only one Restart Counter is maintained for all protocols within the SGW. In some embodiments, the active SGW shares a Peer IP address and Restart Counter pair, for each peer that the active SGW communicates with. In these embodiments, as peers periodically, go, the active SGW communicates this information to the backup SGW. This information is typically not change in a stable network.

At step 330, a primary SGW transmits session state information associated with the mobile devices supported by the primary SGW to at least one corresponding backup SGW. That is, as it processes UE related messages, the active SGW identifies session-state relevant events for the UE and communicates this information to the backup SGW.

Referring to box 335, the session state information may be transmitted at predetermined intervals such as after a predetermined number of seconds or minutes. The session state information may also be transmitted after the occurrence of one or a predetermined number of relevant subscriber events. A relevant subscriber event comprises, illustratively, a Create Session Event, a Create Bearer Event, a Delete Session Event, and/or a Delete Bearer Event. Generally speaking, a relevant subscriber events for purposes of a session restoration embodiment comprises any event that results in the creation or destruction of a user session, such as given in the following examples:

Create Session Event: When a new session is created, new control TEIDs are allocated to the S5 interface towards the PGW. If this is the first session for the UE, then a new control TEID is allocated to the S11 interface towards the MME. At the completion of the Create event, data plane TEIDs for the default bearer are also assigned for traffic ingressing or egressing the SGW on the S5-u, and ingressing the SGW on the S1-u interface from the eNodeB.

Create Bearer Event: When a new dedicated bearer is created, new data plane S5-u TEIDs are allocated for traffic ingressing or egressing the SGW, and ingressing the SGW on the S1-u interface.

Delete Session Event: when a session is deleted, the session needs to be deleted from the backup SGW, and deprogrammed from the data plane.

Delete Bearer Event: When a dedicated bearer is deleted, the bearer context needs to be deleted from the backup SGW, and deprogrammed from the forwarding plane.

The frequency of change is based on the frequency of setup/teardown of PDN sessions and dedicated bearers. However, this is not as frequent as the events that arrive at the SGW that modify the state of the sessions and bearers. The state information primarily comprises session state of the UE that does not change significantly during the life of the session.

In some embodiments, to avoid an incorrect assessment by the backup SGW that the active SGW has indeed failed, the active SGW periodically sends keep alive messages to the backup SGW in case there are few relevant events to convey.

At step 340, at each backup SGW the session state information transmitted from one or more primary SGWs supported by the backup SGW is stored. Referring to box 345, such session state information may comprise one or more of information sufficient to indicate a session is in an active state, information sufficient to restore a session with an active UE, information sufficient to restore a session with an inactive UE, information sufficient to re-create control and data planes for UE sessions or other information.

FIG. 4 depicts a flow diagram of a session state restoration method according to one embodiment. Specifically, FIG. 4 depicts a method 400 adapted for use in a gateway operating as an alternate or backup gateway, such as an alternate or backup SGW in an LTE network having stored thereon session state information such as described above with respect to FIG. 3.

At step 410, a gateway such as a SGW operating as a backup SGW is initialized and a communications path to a primary SGW established, illustratively in accordance with method 300 as described above with respect to FIG. 3.

At step 420, the backup gateway receives and stores UE state information pertaining to UE supported by the active SGW until such time as a failure of the primary SGW is indicated. Referring to box 425, a primary SGW failure may be indicated via an explicit failure indication, a timeout of a neighboring node alive indicator, a peer counter timeout and the like. Such an indication may be due to an actual failure of the primary SGW or some other condition, such as a maintenance condition associated with the primary SGW or an overload condition associated with the primary SGW.

At step 430, after a primary SGW failure, the backup gateway assumes the IP addresses and path management duties of the failed primary gateway. In some embodiments, the UEs associated with the failed SGW are maintained in an idle state. Referring to box 435, the backup gateway may begin to advertise IP addresses with a preferred criteria such that control plane and data plane traffic and packets are routed to the backup gateway.

At step 440, UE connectivity and session validity with the backup SGW is reaffirmed. That is, the backup SGW generates the various control messages to reestablish or reaffirm data plane and control plane UE session data as validly supported by the backup SGW. Referring to box 445, in some embodiments UE connectivity may be reaffirmed by generating a DDN (IMSI) for use by the MME to restore S1-u dl paths, by causing UE detach and reattach operations to thereby restore UE sessions, to restore the UE, by activating UEs previously forced into an idle state to thereby restore data and control plane information to the UE's, or by other mechanisms.

At step 450, the backup SGW continues to support UE sessions, thereby taking over the functions of the failed primary SGW.

The specific control messages generated by the backup SGW depends upon the session state information synchronized between the primary and backup SGWs. Some session state information is not sufficient to maintain UE sessions. Some session state information is only sufficient to cause a detachment/reattachment of a UE. Some session state information is sufficient to retain data plane and control plane sessions.

Various types of session state information and the utilization of such information within the context of session restoration are discussed in more detail with respect to simultaneously filed U.S. patent application Ser. No. 13/423,247, filed on Mar. 18, 2012, entitled SYSTEM AND METHOD FOR SESSION RESILIANCY AT GEO-REDUNDANT GATEWAYS, and Ser. No. 13/423,249, filed on Mar. 18, 2012, entitled SYSTEM AND METHOD FOR SESSION RESTORATION AT GEO-REDUNDANT GATEWAYS, both of which are herein incorporated by reference in their entireties.

In various embodiments, when data plane or control plane traffic associated with a UE session arrives at the backup SGW (i.e., backup SGW Ingress Data Plane or Ingress Control Plane triggered), the backup SGW responsively generates a DDN (IMSI) message for the MME to restore S1-u DL paths. Referring to box 445, the backup SGW generates the DDN (IMSI) message in response to a Network generated control plane or data plane traffic, UE generated data plane traffic, control messages on S11, data traffic on S1-u or S5-u and so on.

In response to the DDN (IMSI) message, the MME operates to process idle mode UEs by (a) performing an IMSI paging function; (b) detaching the UE while providing a selected re-attach code; and c) performing an IMSI attach if the UE is in idle mode. The MME operates to process active or connected mode UEs by (a) performing a detach; and (b) performing an IMSI attach. Further, the backup SGW forwards a Delete Session Request to the PGW, which responsively cleaned up UE state anomalies via PCRF and IMS. Since the UEs are maintained in idle state (per step 430), the MME detaches and reattaches the UEs thus maintaining data plane and 12 plane integrity of the sessions supported thereby.

Post Failover Handling

Generally speaking, there are two gateways or nodes participating in a geo-redundant pair. At a given time, the two gateways or nodes may be performing independent or different functions for respective UEs and the like. For purposes of this discussion it will be assumed that one of the nodes is a "working" node while the other node is a "protect" node. The "working" node is the one which is intended to be the one handling all the calls in a normal state, while the "protect" is the node which is intended to backup the "working" node.

The node which is currently handling the calls flows and data flows is called the "active" whereas the other node which is backing up the active is "standby". The "active" node is the one which is currently handling all the calls whereas the "standby" is the node which is backing up the "active" node. While a revert process is occurs, the operational state of the active will be "active-releasing" and that of the "standby" would be "active-acquiring".

The node which is currently attracting control and data traffic is denoted as the "master" whereas the other node is denoted as the "slave".

Generally speaking, when the nodes become operational, the "working" node takes the operational state of "active" and IP address ownership as "master" whereas the "protect" node takes the operational state of "standby" and the IP address ownership as "slave".

There are two primary actions that a service provider or network operator may require of the protect and standby nodes after a geo-redundant failover has occurred; namely, a non-revertive action and a revertive action.

A non-revertive action is where the provider does not want to return (failover) the protected sessions back to the initially failed "working" node once the failed working node has recovered after the failure. Specifically, after a failover occurs, the "protect" node becomes the "active" and "master" node. When the "working" node becomes operational, it takes the role of "standby" and "slave". Both systems continue to perform in their new roles.

A revertive action is where the provider does want to return (failover) the protected sessions back to the initially failed "working" node once the failed working node has recovered after the failure. This action is sometimes preferred when the provider expects all the sessions to be restored to the "working" system. When the geo-redundant systems are far apart, a failover can cause additional latency for traffic and may also cost the provider for sub-optimal forwarding of packets through their networks.

Revertive actions may be invoked manually or automatically. In a manual approach, the network is monitored by the provider following a failover. Once the network is stable, the revertive action is triggered by manual intervention. In an automatic approach, the network elements themselves detect the stability and/or other operational criteria associated with the network based on based on various parameters. When an appropriate level of network stability or other operational criteria is achieved, a revertive action may automatically be triggered.

Various embodiments enable revertive action in a manner adapted to minimize control and traffic plane losses or other disruptions.

Figure 5A:
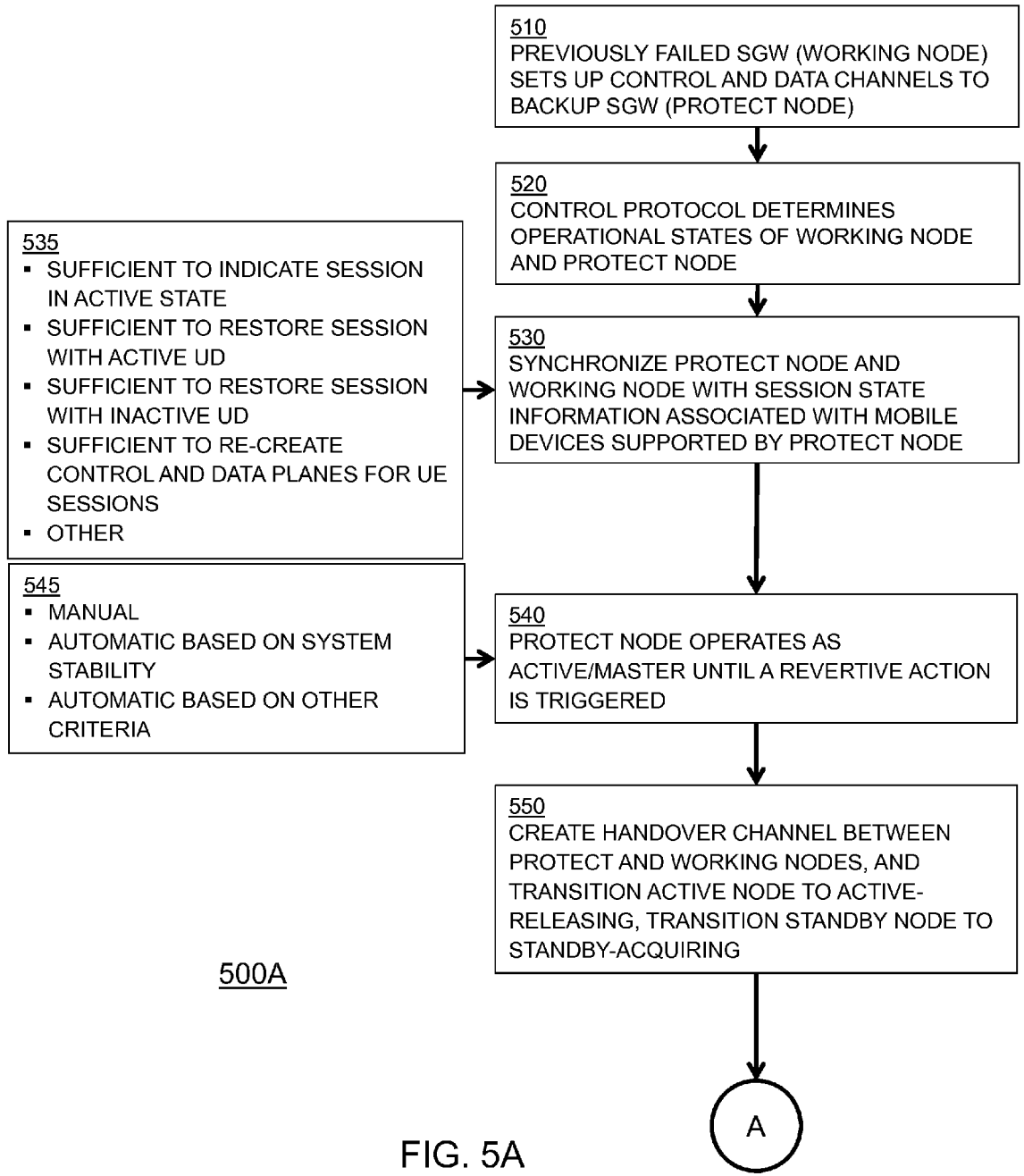
FIG. 5 depicts a flow diagram of a revertive action method according to one embodiment.
Figure 5B:
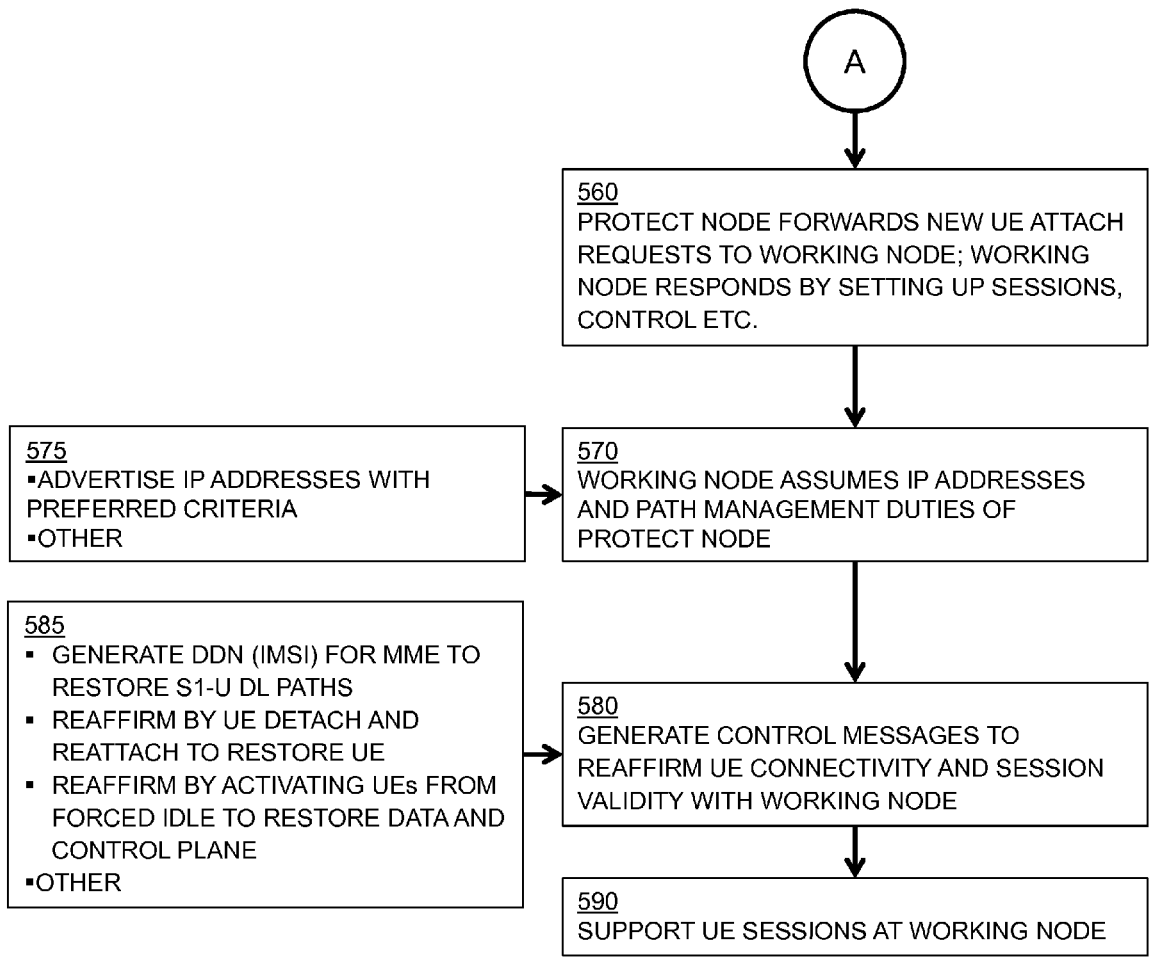

FIG. 5 depicts a flow diagram of a revertive action method according to one embodiment. Specifically, FIG. 5 depicts a method of automatically reverting from a backup SGW or protect node to a previously failed SGW or working node in a manner adapted to minimize control and traffic plane loss for revertive UE sessions.

At step 510, the previously failed SGW or working node sets up a control channel to the backup SGW or protect node. That is, after the previously failed SGW (i.e., the working node) becomes operational again, it reestablishes communications with the backup SGW (i.e., the protect node) by setting up a control channel.

At step 520, the control protocol is used to determine the operational states of the working node and protect node. After a failure recovery, the "working" node (e.g., previously failed SGW) will be the "standby" and "slave" node, whereas the "protect" node (e.g., the backup SGW presently supporting UE sessions) will be the "backup" and "slave".

At step 530, the protect node and working node are synchronized such that both nodes store session state information associated with mobile devices supported by the protect node. That is, while the protect node continues to act as the active node supporting the various UE sessions, the corresponding session state information is provided to the working node. Referring to box 535, such session state information may comprise one or more of information sufficient to indicate a session is in an active state, information sufficient to restore a session with an active UE, information sufficient to restore a session with an inactive UE, information sufficient to re-create control and data planes for UE sessions or other information.

In various embodiments, the session state information synchronized with the working node at step 530 of FIG. 5 is substantially the same as the session state information stored at backup SGWs as previously discussed with respect to step 340/345 of FIG. 3. However, in various other embodiments, the session state information synchronized with the working node at step 530 is different than the session state information stored at backup SGWs as previously discussed with respect to step 340/345 of FIG. 3.

For example, in various embodiments, the session state information stored at step 340 of FIG. 3 and used to migrate UE sessions from a primary SGW to one or more backup SGWs is the same as the session state information synchronized at step 530 of FIG. 5. In various other embodiments, the session state information stored at step 340 of FIG. 3 and used to migrate UE sessions from a primary SGW to one or more backup SGWs is different than the session state information synchronized at step 530 of FIG. 5. In various other embodiments, the session state information stored at step 340 of FIG. 3 and used to migrate UE sessions from a primary SGW to one or more backup SGWs is the different than the session state information synchronized at step 530 of FIG. 5 for some or all of a plurality of backup SGWs.

At step 540, the protect node operates as an active/master node until a revertive action is triggered. That is, the "active" node will continue to act as the "master" and hence attract all traffic from the network. This will occur when using either an L2 (VRRP) or L3 (IP Address advertisement) mechanism. Once the protect node and working node are synchronized with respect to session state information and, optionally, other information, a revertive action may be triggered. Referring to box 545, the revertive action may be manually triggered, automatically triggered based on system stability, automatically triggered based on some other criteria, such as congestion conditions proximate one or both of the working and protect nodes, error rates, policy preferences and the like.

At step 550, in response to the triggering of a revertive action, a handover channel is created between the protect and working nodes. The handover channel facilitates handing over the protect node supported UE sessions back to the working node. In addition, the active node (i.e., protect node or backup SGW) is transitioned to an active-releasing operational state, while the standby node (i.e., working node or primary SGW) is transitioned to a standby-acquiring operational state.

At step 560, working node operational control of UE sessions begins to be restored as control of all new UE session attaches is transitioned from the protect node to the working node. Specifically, rather than handling new UE attach requests locally, the protect node forwards all new UE attach requests toward the working node via the handover channel as such requests are received or identified. The working node responds to the new UE attach requests by interacting with the requesting UEs to perform various control functions such as establishing sessions and the like. Following the control set up, data flows associated with the new sessions will also be forwarded to the working node such that the working node exerts complete control over the sessions.

At steps 570-590, control of all existing UE session attaches is transitioned from the protect node to the working node. Specifically, individually or in groups, existing UE sessions are transitioned from the protect node to the working node using the synchronized session state information discussed above with respect to step 530. One embodiment will now be discussed in particular with respect to steps 570-590, though various modifications to this embodiment are contemplated by the inventors.

At step 570, the working node assumes the IP addresses and path management duties of the protect node. In some embodiments, the UEs associated with the protect node are maintained in an idle state. Referring to box 575, the working node may begin to advertise IP addresses with a preferred criteria such that control plane and data plane traffic and packets are routed to the working node.

At step 580, UE connectivity and session validity with the working node is reaffirmed. That is, the working node generates the various control messages to reestablish or reaffirm data plane and control plane UE session data as validly supported by the working node. Referring to box 585, in some embodiments UE connectivity may be reaffirmed by generating a Downlink Data Notification (DDN) IMSI message for the MME to restore S1-u DownLink (DL) paths, by causing UE detach and reattach operations to thereby restore UE sessions, to restore the UE, by activating UEs previously forced into an idle state to thereby restore data and control plane information to the UE's, or by other mechanisms.

At step 590, the working node continues to support UE sessions, thereby taking over the functions of the protect node. In particular, the working node announces its routes and declares itself as active and master, whereas the protect node adopts the role of standby and slave.

In various embodiments, the UEs or UE sessions that revert back to the working node comprise only those UEs or US sessions that were previously supported by the working node. For example, as will be discussed in more detail below, various embodiments contemplate that both the working and protect nodes are associated with respective and non-conflicting IP address sets such that, illustratively, each may serve as a protect node for the other without having conflicting addresses.

In various embodiments, a revertive action may be partial due to the presence of congestion or other criteria. For example, when a working node becomes operational it may not be desired to revert all UE sessions to that node due to various network operating conditions, policy changes or other factors. In this case, only a portion of the UE sessions are moved from the protect node to the working node. Similarly, the time within which the UE sessions are moved may be adapted (lengthened or shortened) based upon the various factors. Other criteria such as policy-based criteria, a UE subscriber service level and the like may also be used to adapt the revertive action. The various criteria are managed by either or both of the working and protect nodes, or by the network management system.

The specific control messages generated by the working node depends upon the session state information synchronized between the protect and working node(s). Some session state information is not sufficient to maintain UE sessions. Some session state information is only sufficient to cause a detachment/reattachment of a UE. Some session state information is sufficient to retain data plane and control plane sessions.

Various types of session state information and the utilization of such information within the context of session restoration are discussed in more detail with respect to simultaneously filed U.S. patent application Ser. No. 13/423,247, filed on Mar. 18, 2012, entitled SYSTEM AND METHOD FOR SESSION RESILIANCY AT GEO-REDUNDANT GATEWAYS, and Ser. No. 13/423,249, filed on Mar. 18, 2012, entitled SYSTEM AND METHOD FOR SESSION RESTORATION AT GEO-REDUNDANT GATEWAYS, both of which are herein incorporated by reference in their entireties.

Thus, the various embodiments contemplate periodically transferring a portion of session state information from a primary SGW to a backup SGW (directly or via the MME) wherein the transferred session state information is only sufficient to identify mobile or subscriber devices having active sessions. In this manner, the backup SGW may prompt those mobile or subscriber devices to reauthorize or reattach themselves to the network using the IP address and other information associated with the backup SGW. Simultaneously, "session alive" or "session active" response messages are sent by the backup SGW to inquiring management entities on behalf of or spoofing those mobile or subscriber devices having active sessions. In this manner, the session state information associated with those mobile or subscriber devices at the inquiring management entities is preserved by the inquiring management entities.

The various embodiments described herein generally contemplates that session state information and/or other information associated with a primary SGW is stored at a backup SGW for use in implementing a failover mechanism. However, in various embodiments such information may be stored at multiple backup SGWs and/or at one or more network elements that are not SGWs. The stored session state information and/or other information associated with the primary SGW is retrieved by the backup SGW as part of the failover mechanism.

Various embodiments are modified to use one or more additional mechanisms for accelerating the resilient session restoration process. One mechanism for accelerating the session restoration process comprises the use of a predefined IE on the first few Echo Requests transmitted from SGW to the MME to indicate that the backup SGW has taken over. The MME responsively accelerates the recovery of downlink TEIDs of active sessions instead of waiting for data plane notification on the S5-u, or for control messages on S11 and S5-c. One mechanism for accelerating the session restoration process comprises periodically passing a list of active sessions from the active SGW to the backup SGW so that the backup SGW can proactively start populating those sessions with their downlink TEIDs and bring them to active state faster. These and other mechanisms may be used individually or in any combination to improve or accelerate the session restoration process.

Synchronizing state information between the primary and backup SGWs, as well as a frequency of such synchronization depends on various factors, such as network topology, available resources, desired speed of restoration and the like.

As an example, a system such as adapted for an LTE network utilizing General Packet Radio System (GPRS) Tunneling Protocol or GTP may synchronize some or all of the state information pertaining to GDP information, path management information and radiofrequency (RF) related information associated with various sessions or UE.

State-related GTP information may comprise, illustratively, UL/DL FTEIDs, control FTEIDs for S11 and S5-c, data FTEIDs for S1-u and S5-u, ULI and the like. State-related path management information may comprise, illustratively, restart counters for S11, 51-u and S5 and the like. State-related RF information may comprise, illustratively, origin state, RAT and the like (roughly 5128 per APN per APN).

Synchronization/update frequency may be predetermined, periodic nature and/or related to the various network events.

In various embodiments, primary and backup SGWs are synchronized when sessions are created and/or destroyed, such as synchronizing eight GTP/RF messages for a session create event, six GTP/RF messages for a session destroy event, and two IMCP messages for a session create/destroy event.

In various embodiments, primary and backup SGWs are synchronized when bearers are created and/or destroyed, such as synchronizing six GTP/RF messages for a better create event, six GTP/RF messages for a bearer destroy event, and two IMCP messages for a bearer Create/Destroy event.

In various embodiments, primary backup SGWs are synchronized in response to or network configuration events like MME relocations, such as synchronizing four GTP/RF messages and two IMCP messages for an MME relocation event.

In various embodiments, dual IP addresses are used on S11 and S5 where one addresses local in one addresses backup.

The local IP addresses are used to retain existing sessions at the backup SGW, while the backup IP addresses are used for new sessions, sessions transferred from the failed or failing primary SGW, control traffic associated with the failed or failing primary SGW and so on. Specifically, the IP address allocation even to the backup SGW is split into two portions (which may or may not be the same size), where a first portion is used for existing data and control plane traffic at the backup SGW, and a second portion is used for data and control plane traffic associated with the failed or failing SGW. In this manner, collisions are avoided as session support moves from the primary SGW to the backup SGW. That is, a backup SGW becoming active SGW utilizes an active SGW bundle of IP addresses. In this manner, conference are avoided and support for sessions may be transferred between SGWs on a per-bundle basis with respect to their IP addresses. In various embodiments, failure suppression is employed, one other embodiments it is not employed.

Thus, two (or more) service gateways (SGWs) or nodes may be operating as a geo-redundant pair and may be denoted as a primary/backup or working/protect gateways or nodes. The primary or working SGW or node operates in a master mode, while the backup or protect SGW(s) or node(s) operate in a slave mode. In the event of a failure of the primary or working SGW, the backup or protect SGW(s) begin operating in the master mode. In this situation, the UEs and their sessions are "failed over" to the slave(s). When the failed primary or working SGW/node becomes operational again, it may be necessary to return or failover the newly sessions from the backup or protect SGW back to the primary or working SGW/node.

In a master mode of operation, the master SGW/node advertises route data that is preferable to the route data advertised by the slave(s) SGW such that any node wishing to send traffic will select the master as the route for that traffic. To ensure that this happens, the slave SGW may for example advertise "poisoned" route data; namely, route data that would never be selected for use do to its high cost or some other negative parameter.

Figure 6:
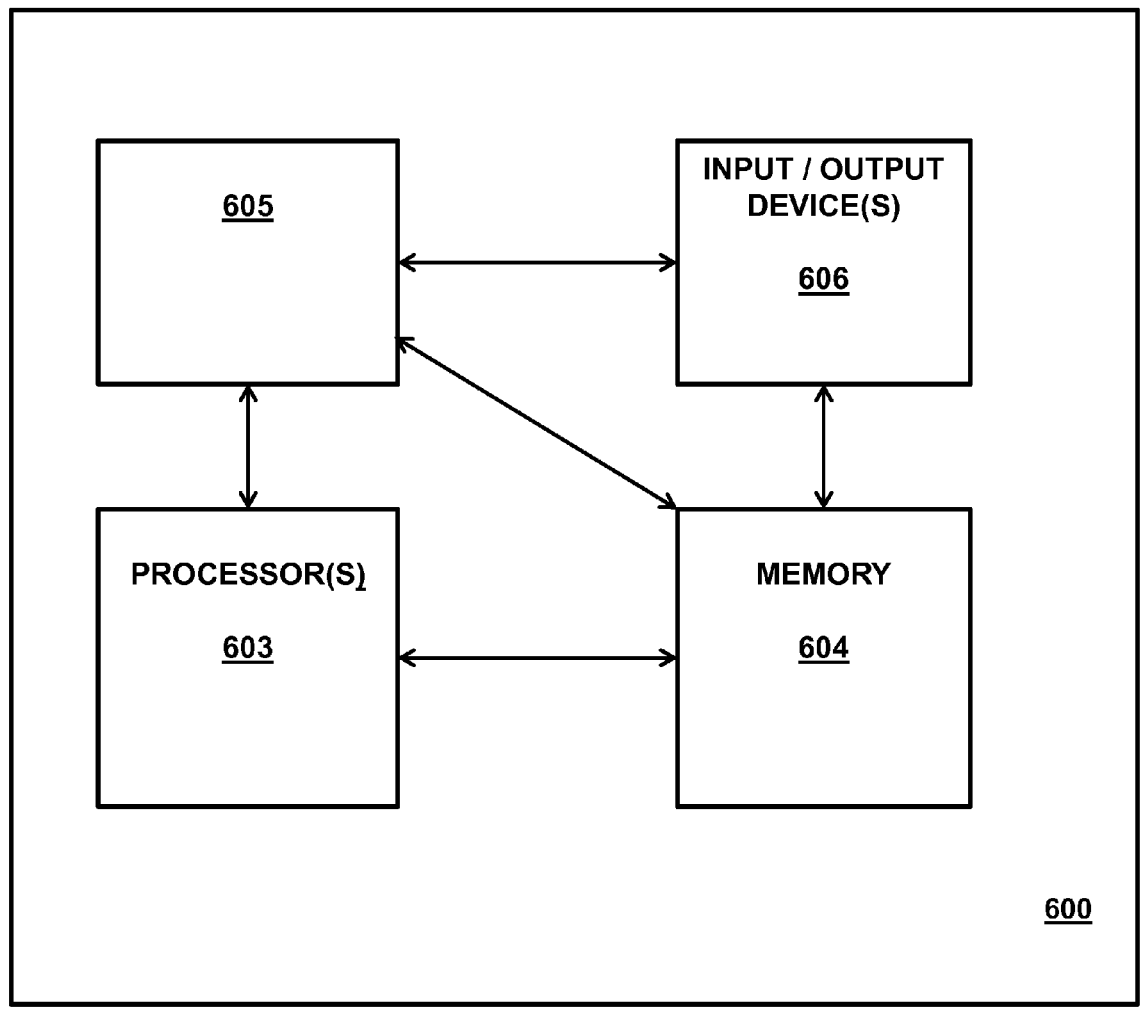
FIG. 6 depicts a high-level block diagram of a general purpose computer suitable for use in performing the functions described herein with respect to the various embodiments.

FIG. 6 depicts a high-level block diagram of a general purpose computer suitable for use in performing the functions described herein with respect to the various embodiments. In particular, the architecture and functionality discussed herein with respect to the general-purpose computer is adapted for use in each of the various switching and communication elements or nodes discussed herein with respect to the various figures; namely, the UEs 102, eNodeBs 111, SGWs 112, PGW113, MMEs 114, PCRF115, and network management system 140. It will be appreciated that some of the functionality discussed herein with respect to describe general purpose computer may be implemented in various network elements or nodes, and/or a network operations center (NOC) or network management system (NMS) operative to configure and manage elements within the network.

As depicted in FIG. 6, system 600 comprises a processor element 602 (e.g., a CPU), a memory 604, e.g., random access memory (RAM) and/or read only memory (ROM), a packet processing module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It will be appreciated that computer 600 depicted in FIG. 6 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for managing a backup service gateway (SGW) associated with a primary SGW, the method comprising:
    in response to a determination that the primary SGW has returned to operation, synchronizing user equipment (UE) session state information between the backup and primary SGWs for at least those UEs previously supported by the primary SGW; and
    in response to a revertive action trigger, creating a handover channel between the backup and primary SGWs to enable a transition of UE support from the backup SGW to the primary SGW.

2. The method of claim 1, wherein said determination that the primary SGW has returned to operation is made in response to the primary SGW establishing a control channel to the backup SGW.

3. The method of claim 1, further comprising determining operational states of the primary and backup SGWs using a communications protocol.

4. The method of claim 1, wherein said session state information comprises information sufficient to indicate a UE session is in an active state.

5. The method of claim 1, wherein said session state information comprises information sufficient to restore a session with an active UE.

6. The method of claim 1, wherein said session state information comprises information sufficient to restore a session with an inactive UE.

7. The method of claim 1, wherein said session state information comprises sufficient information to restore control and data planes for UE sessions.

8. The method of claim 1, wherein said revertive action trigger comprises a manual trigger.

9. The method of claim 1, wherein said revertive action trigger comprises an automatic trigger based on at least one of a system stability condition and a system congestion condition.

10. The method of claim 1, further comprising generating one or more control messages adapted to reaffirm UE connectivity and session validity with the primary SGW.

11. The method of claim 10, wherein said control messages comprise a Downlink Data Notification (DDN) message.

12. The method of claim 10, wherein said control messages are adapted to reaffirm by causing a US to detach from the network and the reattach to the network.

13. The method of claim 10, wherein said control messages are adapted to reaffirm by activating UEs from an idle state to restore thereby data and control plane connectivity.

14. The method of claim 1, wherein said handover channel is adapted to migrate to said primary SGW support for UE session newly requested of said backup SGW.

15. The method of claim 14, wherein said handover channel is adapted to migrate to said primary SGW existing UE sessions supported by said backup SGW.

16. The method of claim 15, wherein:
said backup SGW is associated with a set of local IP addresses that does not conflict with IP addresses associated with said primary SGW; and
said existing UE sessions migrated to said primary SGW comprise only those UE sessions initially associated with IP addresses associated with said primary SGW.

17. The method of claim 1, wherein only a portion of the UE sessions initially associated with the working node are migrated back to the working node, said portion being selected according to one or more of a system stability parameter, a system congestion parameter, a policy-based criterion and a subscriber service level.

18. An apparatus for use in a service gateway (SGW) adapted to backup a primary SGW, the apparatus comprising:
a processor configured for managing a backup service gateway (SGW) associated with a primary SGW, the method comprising:
in response to a determination that the primary SGW has returned to operation, synchronizing user equipment (UE) session state information between the backup and primary SGWs for at least those UEs previously supported by the primary SGW; and
in response to a revertive action trigger, creating a handover channel between the backup and primary SGWs to enable a transition of UE support from the backup SGW to the primary SGW.

19. A non-transitory computer readable medium including software instructions which, when executed by a processer, perform a method for managing a backup service gateway (SGW) associated with a primary SGW, the method comprising:
in response to a determination that the primary SGW has returned to operation, synchronizing user equipment (UE) session state information between the backup and primary SGWs for at least those UEs previously supported by the primary SGW; and
in response to a revertive action trigger, creating a handover channel between the backup and primary SGWs to enable a transition of UE support from the backup SGW to the primary SGW.

20. A computer program product, wherein a computer is operative to process software instructions which adapt the operation of the computer such that the computer performs a method for managing a backup service gateway (SGW) associated with a primary SGW, the method comprising:
in response to a determination that the primary SGW has returned to operation, synchronizing user equipment (UE) session state information between the backup and primary SGWs for at least those UEs previously supported by the primary SGW; and
in response to a revertive action trigger, creating a handover channel between the backup and primary SGWs to enable a transition of UE support from the backup SGW to the primary SGW.

* * * * *